(12) United States Patent
Ambrosius et al.

(10) Patent No.: US 7,604,862 B2
(45) Date of Patent: Oct. 20, 2009

(54) MULTILAYER PIGMENTS BASED ON GLASS FLAKES

(75) Inventors: Klaus Ambrosius, Dieburg (DE); Ralf Anselmann, Ramsen (DE); Sabine Schoen, Herten (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 10/483,182

(22) PCT Filed: Jul. 1, 2002

(86) PCT No.: PCT/EP02/07219
§ 371 (c)(1),
(2), (4) Date: Jan. 9, 2004

(87) PCT Pub. No.: WO03/006558
PCT Pub. Date: Jan. 23, 2003

(65) Prior Publication Data
US 2004/0170838 A1    Sep. 2, 2004

(30) Foreign Application Priority Data
Jul. 12, 2001    (EP)    ................................... 01117004

(51) Int. Cl.
*B32B 5/16*    (2006.01)
(52) U.S. Cl. ........................ 428/404; 428/325; 428/328; 428/329; 428/406; 427/212; 252/301.6 R
(58) Field of Classification Search ................. 428/403, 428/404, 405, 406, 325, 328, 329; 427/212; 252/301.6 R
See application file for complete search history.

(56) References Cited

U.S. PATENT DOCUMENTS

| 3,087,828 A | | 4/1963 | Linton et al. | |
| 3,138,475 A | | 6/1964 | Schroder et al. | |
| 3,331,699 A | | 7/1967 | Marshall et al. | |
| 4,867,793 A | | 9/1989 | Franz | |
| 4,954,175 A | * | 9/1990 | Ito et al. ...................... | 106/417 |
| 5,221,341 A | | 6/1993 | Franz et al. | |
| 5,433,779 A | | 7/1995 | DeLuca, Jr. | |
| 5,436,077 A | | 7/1995 | Matsuba et al. | |
| 5,540,769 A | | 7/1996 | Franz | |
| 5,753,371 A | | 5/1998 | Sullivan et al. | |
| 6,045,914 A | | 4/2000 | Sullivan et al. | |
| 6,132,873 A | * | 10/2000 | Dietz et al. .................. | 428/404 |
| 6,284,032 B2 | * | 9/2001 | Andes et al. ................. | 106/436 |
| 6,517,628 B1 | * | 2/2003 | Pfaff et al. ................... | 106/417 |
| 6,524,381 B1 | * | 2/2003 | Phillips et al. ............... | 106/417 |
| 6,596,070 B1 | * | 7/2003 | Schmidt et al. ............. | 106/417 |
| 6,599,355 B1 | | 7/2003 | Schmidt et al. | |
| 6,689,205 B1 | * | 2/2004 | Bruckner et al. ............ | 106/415 |
| 6,777,085 B1 | * | 8/2004 | Argoitia et al. ............. | 428/403 |
| 6,875,264 B2 | * | 4/2005 | Zimmermann et al. ...... | 106/446 |

FOREIGN PATENT DOCUMENTS

| DE | 19951871 | 5/2001 |
| DE | 100 18 904 | 10/2001 |
| EP | 1 045 014 | 10/2000 |
| JP | 6116508 A2 | 4/1994 |
| JP | 7-246366 | 9/1995 |
| JP | 10279828 | 10/1998 |
| WO | 97 46624 | 12/1997 |
| WO | 99 20695 | 4/1999 |

OTHER PUBLICATIONS

G. Pfaff, et al., "Angle-Dependent Optical Effects Deriving from Submicron Structures of Films and Pigments", *Chemical Reviews*, vol. 99, No. 7, pp. 1963-1981 (1999).
Patent Abstracts of Japan, "Production of Flaky Material Coated With Titania or Zirconia", Apr. 26, 1994, (Chem. Abs. 121 (18) 207716A); JP6116508A2; and English Translation.
Patent of Abstracts of Japan; vol. 1999, No. 01, Jan. 29, 1999 & JP 10 279828 A (MerckX Japan), Oct. 20, 1998.
English translation of JP 7-246366—"A Pearlescent Material and a Paint That Contains Same", Inventor: Kiwa Yamane.
New glass flake Pigment "Metashine" "Crystal Star" Toyo Aluminium K.K. Powder Paste Division, published Jul. 3, 1998.
Bansal, N.P., Doremus, R.H., Handbook of Glass Properties, 1986, Academic Press, Inc, p. 34, ISBN 0-12-078140-9.

* cited by examiner

*Primary Examiner*—H. (Holly) T Le
(74) *Attorney, Agent, or Firm*—Millen, White, Zelano & Branigan, P.C.

(57) ABSTRACT

The present invention relates to multilayer pigments based on glass flakes and to a method for the production of such pigments. The resulting pigment can be used in any application for which pearlescent pigments have been heretofore used such as, for example, in plastics, paints, inks, cosmetic formulations, coatings including solvent or waterborne automotive paint systems, powder coatings, inks and agriculture foils, for the laser-marking of papers and plastics.

22 Claims, No Drawings

MULTILAYER PIGMENTS BASED ON GLASS FLAKES

The present invention relates to multilayer pigments based on glass flakes, to a method for the production of such pigments and their use in plastics, paints, coatings, powder coatings, inks, printing inks, glasses, ceramic products, agriculture foils, for laser-marking of papers and plastics and in cosmetic formulations.

Lustre pigments or special-effect pigments are employed in numerous fields in industry, especially in the sector of automotive finishes, in decorative coatings, in plastics, in paints, in printing inks and in cosmetic formulations.

Multilayer interference pigments with alternating layers of high and low refractive index are known. They differ in respect of the carrier material and of the material of the individual layers, and in the preparation process. The layers are prepared either by precipitation in a wet process or by vapor deposition or sputtering under vacuum. The layers applied to the carrier or to a release layer are all optically active and contribute to the development of the interference colors.

U.S. Pat. No. 4,434,010 discloses a multilayer interference pigment consisting of a central layer of a reflective metal, such as aluminum, and alternating layers of two transparent dielectric materials of high and low refractive index respectively, such as titanium dioxide and silicon dioxide, for example. This multilayer pigment is used preferably for counterfeit-protected products like securities or banknotes.

JP H7-759 discloses a multilayer interference pigment with metallic lustre, for which a substrate is coated with alternate layers of titanium dioxide and silicon dioxide. The substrate comprises flakes of aluminum, gold or silver, or of mica or glass, with a coating of metals. The depth effect which is characteristic of and desired for interference pigments, however, cannot be generated. This is because of the total reflection of the light at the metal layer which forms the core. Consequently, the interference effect remains limited to the layers which are located on top of the metal layer. Furthermore, the lack of transparency of the substrate greatly restricts options for combinations with further pigments in applications-related formulations.

U.S. Pat. No. 3,438,796 and U.S. Pat. No. 5,135,812 describe, for example, metal lustre pigments having a central essentially non-transparent aluminum film coated on both sides in alternation with dielectric films of low refractive index, such as silicon dioxide or magnesium fluoride, and with partially transparent metal films, such as films of chromium or aluminum, for example. Owing to the preparation process, the central metal film of these pigments is coated only on the top and bottom sides of the platelets, while the side areas constitute broken edges and lie open towards the medium.

DE 44 05 494, DE 44 37 753, DE 195 16 181 and DE 195 15 988 disclose lustre pigments prepared by coating metal platelets, especially aluminum flakes, with metal oxide layers of low refractive index, such as with a silicon dioxide layer, and with non-selectively absorbing metal oxide layers or metal layers of high refractive index, using CVD or wet chemical techniques.

Lustre pigments based on metal substrates frequently have good properties, including good hiding, but the result on application, such as in the paint, for example, is a "hard" metallic lustre, which is frequently undesired.

Lustre pigments based on transparent platelet-shaped substrates which do not have this "hard" metallic lustre are the subject of WO 93/12182. Mica flakes are covered with a metal oxide layer of high refractive index, such as $TiO_2$, and with a nonselectively absorbing layer. Depending on the thickness of the $TiO_2$ layer, when viewed straight on these pigments exhibit a particular interference colour which becomes increasingly weaker as the viewing angle becomes more oblique and which finally flips to gray or black. The interference color does not change, but a decrease is found in the color saturation.

JP 1992/93206 claims lustre pigments on the basis of glass flakes or mica particles which are covered with a reflecting metal layer and with alternating layers of $SiO_2$ and $TiO_2$.

EP 0 753 545 A2 discloses lustre pigments based on multiply coated, non-metallic, platelet-shaped substrates which are of high refractive index and which are at least partially transparent to visible light and have at least one layer assembly comprising a colorless coating of low refractive index and a reflective coating which absorbs selectively or nonselectively.

Disadvantages of this invention are the technically very complex and costly preparation process and the frequent difficulty in reproducing the pigments in the desired product quality.

U.S. Pat. No. 3,331,699 discloses that glass flakes may be coated with a translucent layer of particles of metal oxide having a high index of refraction, such as titanium dioxide, provided there is first deposited on the glass flakes a nucleating substance which is insoluble in the acidic solution from which the translucent layer of metal oxide is deposited. The patent does not mention that smooth transparent films, not particles, are necessary for quality interference pigments to be developed. The patent teaches that the nature of the glass is not critical, but that the presence of the nucleated surface is critical. It is further stated that there are only a small number of metal oxide compounds which are insoluble in the acidic solution and capable of forming a nucleated surface on the glass flakes; tin oxide and a fibrous boehmite form of alumina monohydrate are the only two such materials disclosed. As demonstrated in the examples below, products prepared according to the teachings of this patent are poor in quality.

U.S. Pat. No. 5,436,077 teaches a glass flake substrate which has a metal covering layer on which is formed a dense protective covering layer of a metal oxide such as titanium dioxide. In this patent, the nature of the glass is unimportant, the metallic coating provides the desired appearance and the overcoating of the metal oxide is present to protect the metallic layer from corrosive environments.

For the preparation of pearlescent pigments the transparency and the thickness of the platy substrate are very important. For the first time EP 0 289 240 B1 discloses the manufacturing of extremely thin glass flakes at reasonable costs. According to the claimed process the glass flakes can be made in any desired composition, e.g., from pure $SiO_2$ and also in any thickness tailored for the intended application down to below 1.0 μm.

It is an object of the present invention to overcome the problems of the prior art and to provide novel multilayer pigments which have advantageous application properties.

Surprisingly, an interference pigment has now been found which is based on multiply coated glass flakes and comprises a particular arrangement of optically functional layers by means of which particular optical effects are achieved.

The invention therefore provides interference pigments on the basis of multiply coated glass flakes which contain at least three alternating layers with a high and a low refractive index.

Preferably the layer structure is as of follows:

(A) a coating having a refractive index n>1.8, (B) a coating having a refractive index n≦1.8, and (C) a coating having a high refractive index n>1.8 and, if desired, (D) an outer protective layer.

The invention also provides the pigments of the invention for the use in paints, lacquers, printing inks, plastics, agricultural foils, ceramic materials, glasses and cosmetic formulations and for the use in laser-marking of papers and plastics.

Preferred glass flakes have a thickness of less than 1 μm, preferably <0.8 μm. Especially preferred are glass flakes with a thickness of ≦0.5 μm. Glass can be classified for example as A glass, C glass, E glass, ECR glass. For the present invention quartz glass is preferred but this glass is very expensive.

Suitable glass flakes preferably prepared according to EP 0 289 240 B1 are characterized in that they contain an average particle size in the range of 5-1000 μm, preferably in the range of 5-150 μm. Preferred glass flakes have an average particle size in the range of 5-150 μm and a thickness of 0.1-0.8 μm, preferably of 0.2-0.5 μm. The aspect ratio of glass flakes is in the range of 10-300, preferably in the range of 50-200.

The glass flakes can be coated in the same way as conventional pearl lustre pigments. Coatings with a metal oxide may be accomplished by any known methods, such as hydrolysis of a metal salt by heating or under alkaline conditions, which deposits hydrated metal oxide, followed by calcination. In general, the procedure involves the dispersing of the thin glass flake particles and combining that dispersion with a precursor which forms a hydrous metal oxide film coating on the flakes.

The thickness of the individual layers of high and low refractive index on the base substrate is essential for the optical properties of the pigment. For a pigment with intensive interference colors, the thickness of the individual layers must be adjusted precisely with respect to one another.

If n is the refractive index of a thin layer and d its thickness, the interference colour of this layer is defined by the product n·d (n·d=optical thickness). The colors which result from such a film under perpendicular light incidence in reflected light result from an intensification of the light of wavelength $$\lambda = \frac{4}{2N-1} \cdot n \cdot d$$

and by an attenuation of the light of wavelength $$\lambda = \frac{2}{N} \cdot n \cdot d$$

where N is a positive integer.

The variation in color which results with increasing film thickness is a consequence of the intensification or attenuation of certain light wavelengths through interference. If two or more layers in a multilayer pigment possess the same optical thickness, the color of the reflected light becomes more intense as the number of layers increases. In addition, it is possible through an appropriate choice of layer thickness to achieve a particularly strong variation of color as a function of the viewing angle. A pronounced, so-called color flop is developed. The thickness of the individual layers, preferably metal oxide layers, irrespective of their refractive index, depends on the field of use and is generally from 10 to 1000 nm, preferably from 15 to 800 nm and, in particular, 20 to 600 nm.

The multilayer pigments of the invention preferably feature a coating (A) of high refractive index in combination with a colorless coating (B) of low refractive index and located thereon a coating of high refractive index. The pigments can comprise two or more, identical or different combinations of layer assemblies, although preference is given to covering the substrate with only one layer assembly (A)+(B)+(C). In order to make the color flop more intense the pigment of the invention may comprise up to 4 layer assemblies, although the thickness of the combined layers on the substrate should not exceed 3 μm.

The glass particles can be coated with three or more layers, preferably with 3, 4, 5, 6 or 7 layers from the group consisting of metal oxides, metal suboxides, metal fluorides, metal oxyhalides, metal sulfides, metal chalcogenides, metal nitrides, metal oxynitrides, metal carbides, or mixtures thereof. Especially preferred are glass flakes coated with 3, 5 or 7 layers. The layer packet (A) and (B) may be present in the standard layer assembly (A)+(B)+(C) up to four times.

The layer (A) of high refractive index has a refractive index n>1.8, preferably n≧2.1. Materials suitable as the layer material (A) are all materials known to the skilled worker which are of high refractive index, are filmlike and can be applied homogeneously to the substrate particles. Particularly suitable materials are metal oxides, metal sulfides or metal oxide mixtures, such as $TiO_2$, $Fe_2O_3$, $TiFe_2O_5$, $Fe_3O_4$, $BiOCl$, $CoO$, $Co_3O_4$, $Cr_2O_3$, $VO_2$, $V_2O_3$, $Sn(Sb)O_2$, $ZrO_2$, $ZnO$ or $SnO_2$, iron titanates, iron oxide hydrates, titanium suboxides (reduced titanium species having oxidation states from <4 to 2) bismuth vanadate, cobalt aluminate, and also mixtures or mixed phases of these compounds with one another or with other metal oxides.

Metal sulfide coatings are preferably selected from sulfides of tin, silver, lanthanum, rare earth metals, preferably cerium, chromium, molybdenum, tungsten, iron, cobalt and/or nickel.

The thickness of the layer (A) is 10-550 nm, preferably 15-400 nm and, in particular, 20-350 nm.

Colorless materials of low refractive index suitable for the coating (B) are preferably metal oxides or the corresponding oxide hydrates, such as $SiO_2$, $MgF_2$, $Al_2O_3$, $AlO(OH)$, $B_2O_3$ or a mixture of these metal oxides, The thickness of the layer (B) is 10-1000 nm, preferably 20-800 nm and, in particular, 30-600 nm.

Materials particularly suitable for the coating (C) of high refractive index are colorless or colored metal oxides such as $TiO_2$, $Fe_2O_3$, $TiFe_2O_5$, $Fe_3O_4$, $BiOCl$, $CoO$, $Co_3O_4$, $Cr_2O_3$, $VO_2$, $V_2O_3$, $Sn(Sb)O_2$, $ZrO_2$, $ZnO$ or $SnO_2$, iron titanates, iron oxide hydrates, titanium suboxides, bismuth vanadate, cobalt aluminate, and also mixtures or mixed phases of these compounds with one another or with other metal oxides. The $TiO_2$ layers additionally can contain absorbing material, e.g. carbon, or coated therewith. Also of particular interest are multiply coated glass flakes whose $TiO_2$ coating (C) is partially reduced and which as well as unchanged $TiO_2$ contains reduced titanium species having oxidation states from <4 to 2 (lower oxides as $Ti_3O_5$, $Ti_2O_3$ through $TiO$, titanium oxynitrides and also titanium nitride). It is also possible to use colorless high refractive materials, for example metal oxides such as zirconium dioxide, in particular titanium dioxide, which have been colored with selectively absorbing colorants, by incorporation of colorants in the metal oxide layer, by doping thereof with selectively absorbing metal cations or by coating the metal oxide layer with a colorant like for example prussian blue or carmine. The thickness of the layer (C) is 10-550 nm, preferably 15-400 nm and, in particular, 20-350 nm.

In addition to the standard layer packet (A)+(B)+(C), in which the layer packet of (A)+(B) may be present up to four times in the pigment of the invention, there are other preferred embodiments. For instance, between the substrate (S) and the layer (A), between the layer (A) and (B), between layer (B) and (C) and/or between layer (C) and the top layer (D) the pigment of the invention may have a further absorbing or nonabsorbing layer [(S1), (A1), (B1), (C1)]. The thickness of the interlayers is 1-50 nm, preferably 1-40 nm and, in particular, 1-30 nm. The inventive pigments may contain a plurality of identical or different combinations (layer packets) of (A)+(B).

The multilayer coated glass flakes obtained in this way are characterised in that at least three homogeneous layers are surrounding the uniform thin glass flakes.

Preferred effect pigments of the present invention are given in the following:

| glass flakes | + $TiO_2$ | + $SiO_2$ | + $TiO_2$ |
|---|---|---|---|
| glass flakes | + $TiO_2$ | + $SiO_2$ | + $Fe_2O_3$ |
| glass flakes | + $TiO_2$ | + $SiO_2$ | + $TiO_2/Fe_2O_3$ |
| glass flakes | + $TiO_2$ | + $SiO_2$ | + $(Sn,Sb)O_2$ |
| glass flakes | + $(Sn,Sb)O_2$ | + $SiO_2$ | + $TiO_2$ |
| glass flakes | + $Fe_2O_3$ | + $SiO_2$ | + $(Sn,Sb)O_2$ |
| glass flakes | + $TiO_2/Fe_2O_3$ | + $SiO_2$ | + $TiO_2/Fe_2O_3$ |
| glass flakes | + $TiO_2$ | + $SiO_2$ | + $MoS_2$ |
| glass flakes | + $TiO_2$ | + $SiO_2$ | + $Cr_2O_3$ |
| glass flakes | + $Cr_2O_3$ | + $SiO_2$ | + $TiO_2$ |
| glass flakes | + $Fe_2O3$ | + $SiO_2$ | + $TiO_2$ |
| glass flakes | + $TiO2$ | + $Al_2O_3$ | + $TiO_2$ |
| glass flakes | + $Fe_2TiO_5$ | + $SiO_2$ | + $TiO_2$ |
| glass flakes | + $TiO_2$ | + $SiO_2$ | + $Fe_2TiO_5/TiO_2$ |
| glass flakes | + TiO suboxides | + $SiO_2$ | + $TiO_2$ suboxides |
| glass flakes | + $TiO_2$ | + $SiO_2$ | + $TiO_2$ + $SiO_2$ + $TiO_2$+ Prussian Blue |
| glass flakes | + $TiO_2$ | + $SiO_2$ | + $TiO_2$ + $SiO_2$ + $TiO_2$ |
| glass flakes | + $TiO_2$ + $SiO_2$ + $TiO_2$ | + $SiO_2$ | + $TiO_2$ + $SiO_2$ + $TiO_2$ | and if desired, (D) an outer protective layer.

A particularly preferred embodiment is the coating of the glass flakes with the following layer assembly:

(S1) optional, $SnO_2$ (A) $TiO_2$ or $Fe_2O_3$ (B) $SiO_2$ (B1) optional, $SnO_2$ (C) $TiO_2$ (D) final coating related to application Coating the substrates with layers (A) and (C) with a high refractive index and, if desired, further colored or colorless coatings produces pigments whose color, gloss, hiding power and angular dependence of perceived color can be varied within wide limits.

The pigments of the invention are easy to produce by virtue of the generation of three or more interference layers of high and low refractive index, precisely defined thickness and smooth surface on the thin glass flakes. In case of layers with different metal oxides or metal oxide mixtures the sequences of high refractive index layers in the multilayer stack can be arranged arbitrary as long as a low refractive index layer is present in between.

The metal oxide layers are preferably applied by wet-chemical means, it being possible to use the wet-chemical coating techniques developed for the production of pearl lustre pigments; techniques of this kind are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, DE 38 42 330 or else in further patent documents and other publications.

Layers of $TiO_2$ can be in the rutile or anatase modification. Preferred are $TiO_2$ (rutile) layers. Titanium dioxide layers can be also reduced by known means, e.g. ammonia, hydrogen, hydrocarbon vapor and mixtures thereof or metal powders, as described in EP 0 735 114, DE 34 33 657, DE 41 25 134, EP 0 332 071, EP 0 707 050 or WO 93/19131. Mixed iron oxide/titanium dioxide layers can be made either by subsequent precipitation or by co-precipitation of the individual metal oxides. In the case of wet coating, the substrate particles are suspended in water, and hydrolysable metal salts are added at a pH which is appropriate for hydrolysis and is chosen such that the metal oxides or metal oxide hydrates are precipitated directly onto the platelets without any instances of side precipitation. The pH is kept constant usually by simultaneous metered addition of a base and/or acid. Subsequently, the pigments are filtered off, washed and dried and, if desired, calcined, with the option to adjust the calcination temperature in respect of the particular coating present. In general, the calcination temperatures are between 250 and 1000° C., preferably between 350 and 900° C. If desired, the pigments may be calcined before being resuspended for the application of further layers by precipitation.

Coating can also take place in a fluidized-bed reactor by means of gas-phase coating, in which case it is possible, for example, to make appropriate use of the techniques proposed in EP 0 045 851 and EP 0 106 235 for preparing pearl lustre pigments.

The metal oxide of high refractive index used is preferably titanium dioxide and/or iron oxide, and the metal oxide of low refractive index preferably used is silicon dioxide.

For the application of the titanium dioxide layers, preference is given to the technique described in U.S. Pat. No. 3,553,001.

An aqueous titanium salt solution is added slowly to a suspension of the substrate to be coated, heated to about 50-100° C., and a substantially constant pH of about 0.5-5 is maintained by simultaneous metered addition of a base, for example aqueous ammonia solution or aqueous alkali metal hydroxide solution. As soon as the desired layer thickness of the $TiO_2$ precipitate has been reached, the addition of both titanium salt solution and base is terminated.

This technique, also referred to as the titration process; is notable for the fact that it avoids an excess of titanium salt. This is achieved by supplying to the hydrolysis only that quantity per unit time which is necessary for uniform coating with the hydrated $TiO_2$ and which can be received per unit time by the available surface area of the particles to be coated. Hereby, the formation of hydrated titanium dioxide particles not precipitated onto the surface to be coated can be minimized.

The application of the silicon dioxide layers can be performed, for example, as follows: A potassium or sodium silicate solution is metered into a heated (50-100° C.) suspension of the substrate that is to be coated. The pH is held constant at about 6-9 by simultaneous addition of a dilute mineral acid, such as HCl, HNO$_3$ or H$_2$SO$_4$. As soon as the desired layer thickness of SiO$_2$ has been reached, the addition of the silicate solution is terminated. The suspension is subsequently stirred for about 0.5 h.

To enhance the light and weather stability it is frequently advisable, depending on the field of application, to subject the multilayer coated glass flakes to a surface treatment. Useful surface treatments and aftertreatments include for example the processes described in DE-C 22 15 191, DE-A 31 51 354, DE-A 32 35 017 or DE-A 33 34 598, DE 40 30 727 A1, EP 0 649 886 A2, WO 97/29059, WO 99/57204, U.S. Pat. No. 5,759,255. This surface treatment further enhances the chemical stability of the pigments and/or facilitates the handling of the pigment, especially its incorporation into various application media.

Multilayer pigments generated in this way yield optically highly improved effect pigments at comparatively low costs with
  superior brilliance
  clear and intense colors
  intense color travel
  alternatively high performance optical filter properties
  very good transparency (important in mixed formulations)
and therefore suited for practically all applications known in the field of pigments. At the same time their shape and particle size can be freely tailored for an optimum performance.

Especially the last mentioned aspect is of high importance as for many applications it is absolutely necessary to adjust the particle shape. For cosmetic use, it is necessary to reduce the size and the thickness to achieve a smooth and silky appearance. For automotive paints or printing inks it is a must to reduce the particle sizes down to below 40 µm or even 20 µm in diameter. This of course means that the thicknesses must follow this trend to maintain an aspect ratio needed for attractive effects. For these examples therefore thicknesses of the substrate of <0.8 µm and <0.5 µm are required. The glass flakes made by the above mentioned process fulfill these requirements. Furthermore they show a superior planarity and smoothness (surface microstructure) which can be expressed by the ratio BET (specific surface area) to WCA (water covering area) as described for aluminum pigments in U.S. Pat. No. 4,936,913 and U.S. Pat. No. 5,127,951. The values are around 3 which indicate the optimum suitability of the material. The high quality of these flakes also explains the observed high transparency of pigments made therefrom.

The preferred designs for the inventive multilayer pigments are:

>3-<40 µm diameter for automotive applications, or even more preferred 10-35 µm, and >0.2-<1 µm average thickness, preferred 0.4-0.8 µm >3-<20 µm diameter for printing applications, preferred 5-20 µm, and >0.2-<0.5 µm average thickness.

The effect pigments of the present invention are advantageously useful for many purposes, such as the coloring of plastics, glasses, ceramic products, agricultural foils, decorative cosmetic formulations and in particular coatings, especially automotive coatings, and inks, including printing inks. All customary printing processes can be employed, for example offset printing, intaglio printing, bronzing, flexographic printing.

The effect pigments of the present invention are also advantageously useful for these purposes in admixture with filler pigments or transparent and hiding white, colored and black organic and anorganic pigments and also with conventional transparent, colored and black luster pigments based on metal oxide coated mica, TiO$_2$ flakes, SiO$_2$ flakes or Al$_2$O$_3$ flakes and coated or uncoated metal pigments, BiOCl pigments, platelet shaped iron oxides, or graphite flakes. The inventive pigments can be further coated with organic or inorganic layers to yield combination pigments.

Additionally, the inventive pigment mixture can contain organic or inorganic colorants, thixotropic agents, wetting agents, dispersing agents, water, organic solvent or solvent mixtures, etc.

The pigment mixture of the invention is simple and easy to handle. The pigment mixture can be incorporated into the system in which it is used by simple stirring. Laborious milling and dispersing of the pigments is not necessary.

The coated glass flakes of the invention can be used for pigmenting and/or coating materials, printing inks, plastics, agricultural films, button pastes, for the coating of seed, for the coloring of food, coatings of medicaments or cosmetic formulations. The concentration of the pigments in the system in which it is to be used is generally between 0.01 and 50% by weight, preferably between 0.1 and 5% by weight, based on the overall solids content of the system. This concentration is generally dependent on the specific application.

Plastics comprising the pigment mixture of the invention in amounts of 0.1 to 50% by weight, in particular from 0.5 to 7% by weight, are frequently notable for a particular brilliance.

In the coating sector, especially in automotive finishing, the pigments according to the invention are employed in amounts of 0.5 to 10% by weight.

In the pigmentation of binder systems, for example for paints and printing inks for intaglio, offset or screen printing, the pigment is incorporated into the printing ink in amounts of 2-50% by weight, preferably 5-30% by weight and in particular 8-15% by weight.

The invention likewise provides pigment preparations comprising multilayer coated glass flakes, optionally effect pigments, binders and, if desired, additives, said preparations being in the form of substantially solvent-free, free-flowing powders or granules. Such granules contain up to 95% by weight of the inventive pigments. A pigment preparation in which the multilayer coated glass flakes of the invention are pasted up with a binder and with water and/or an organic solvent, with or without additives, and in which the paste is subsequently dried and brought into a compact particulate form, e.g. granules, pellets, briquettes, a masterbatch or tablets, is particularly suitable as a precursor for printing inks.

The present invention therefore also provides formulations containing the pigments of the invention.

In order to further illustrate the invention, various non-limiting examples are set forth below. In these, as well as throughout the balance of this specification and claims, all parts and percentages are by weight and all temperatures are in degrees centigrade unless otherwise indicated.

EXAMPLES

Example 1

100 g glass flakes with a maximum diameter of 40 µm (average 22 µm) and an average thickness of 0.5 µm (refractive index 1.5) are suspended in 2 l deionized water. Under vigorous stirring the slurry is heated to 75° C. and the coating is started by feeding an aqueous solution of SnCl$_4$ representing an amount of 3% of SnO$_2$ relative to the glass flakes within 0.5 h. As soon as pH 2.0 is reached 32% NaOH solution is simultaneously fed in to keep the pH at this value.

The slurry is kept stirring for 15 min before the feeding of aqueous $TiCl_4$ solution (400 g $TiCl_4$/$1H_2O$) is started. The pH is kept constant at 2.0 with NaOH. It is continued until the desired colour is achieved. The slurry is kept stirring for again 15 min.

By slowly adding NaOH the pH is raised to 8.0 before the feeding of 1.35 ml/min of 10% sodium silicate solution (from 74 ml of sodium silicate solution with 8% Na and 27% $SiO_2$ diluted with 170 ml of deionized water) is started. The amount necessary for a proper layer thickness has to be exactly calculated because it is not optically visible during the coating process. After again stirring for 15 min the pH is lowered with 10% HCl to 2.0 and the second coating of $TiO_2$ is carried out like the first one until the desired end point is reached. The slurry is kept stirring for one more hour, then filtered off, washed free from salts, dried, calcined at 800° C. (for 30 minutes) and sieved.

From the pigment yielded a draw down is made to measure the coloristic properties. It shows a highly brilliant clear color effect combined with a superior transparency. Especially in the shallow observation angle of the black background it nearly "disappears".

Example 2 (Comparative Example)

This is carried out in the same way like Example 1. Instead of glass flakes mica of the same particle size distribution is used.

The effect on the draw down of the finished pigment is brilliant and color intense but it does not exhibit the unique clearness and particularly the transparency in the shallow angle shown by the glass flakes based multilayer pigments.

Example 3

100 g glass flakes with a maximum diameter of 40 μm (average 22 μm) and an average thickness of 0.8 μm (refractive index 1.5) are suspended in 2 l of deionized water. The suspension is heated to 75° C., adjusted to a pH of 1.8 with dilute hydrochloric acid, first of all coated with $SnO_2$ by adding 3.3 ml/min of $SnCl_4$ solution (from 2.2 g of $SnCl_4$ and 7.5 ml of conc. hydrochloric acid in 100 ml of deionized water). The pH is held constant using 32% sodium hydroxide solution.

Stirring is continued for 15 minutes and then coating with $TiO_2$ is carried out under the same pH/temperature conditions by adding 1.5 ml/min of $TiCl_4$ solution (400 g of $TiCl_4$/l) and keeping the pH constant with 32% sodium hydroxide solution. Coating is interrupted after the second-order green end point is reached, stirring is continued for 15 minutes, the pH is adjusted to 8.0 with diluted sodium hydroxide solution (over the course of about 15 minutes), and then stirring is continued for 10 minutes more.

Coating with $SiO_2$ is then carried out by adding 3 ml/min of dilute sodium silicate solution (from 7.3 g of sodium silicate solution with 8% Na and 27% $SiO_2$ and 80 ml of deionized water) without pH compensation. Afterwards, stirring is continued for 15 minutes, the pH is readjusted to 1.8 with dilute hydrochloric acid (over the course of about 10 minutes) and a second $TiO_2$ layer is applied as described above by adding $TiCl_4$ solution. Coating is interrupted after the third-order green comparison end point has been reached, stirring is continued for 15 minutes, and then the pigment is filtered off, washed, dried and calcined at 850° C. for 30 minutes.

The pigment obtained has an intense green interference color. The division of the $TiO_2$ layers is as follows:

| | |
|---|---|
| 1$^{st}$ layer: | about 170 nm |
| 2$^{nd}$ layer: | about 85 nm |
| Total layer: | about 260 nm. |

The thickness of the $SiO_2$ interlayer is about 5 nm.

Example 4

100 g glass flakes with a maximum diameter of 40 μm (average 22 μm) and an average thickness of 0.5 μm (refractive index 1.5) are suspended in 2 l of deionized water. The suspension is heated to 75° C., adjusted to a pH of 1.8 with dilute hydrochloric acid, first of all coated with $SnO_2$ by adding 3.3 ml/min of $SnCl_4$ solution (from 2.2 g of $SnCl_4$ and 7.5 ml of conc. hydrochloric acid in 100 ml of deionized water). The pH is held constant using 32% sodium hydroxide solution.

Stirring is continued for 15 min., the pH is adjusted to 2.6 with 32% sodium hydroxide solution and an $Al_2O_3$/$Fe_2O_3$/$FiO_2$ layer is applied by adding 1 ml/min $TiCl_4$/$FeCl_3$/$AlCl_3$ solution (394 ml from 165 g 30% $TiCl_4$ solution, 274 g, 34% $FeCl_3$ solution, 6.2 g $AlCl_3 \times 6H_2O$ and 63 ml deionized water).

Stirring is continued for 15 min., the pH is adjusted to 7.5 with 1.3 m/min 32% sodium hydroxide and then stirring is continued for 15 min. more. Coating with $SiO_2$ is carried out by adding 2 m/min sodium silicate solution with 13.5% $SiO_2$ (from 196 g sodium silicate solution with 27% $SiO_2$ and 196 ml-deionized water). The pH is held constant using 15% hydrochloric acid.

Stirring is continued for 30 min., the pH is adjusted to 1.8 by adding 1 ml/min of $SnCl_4$ solution (from 3 g of $SnCl_4$, 10 ml of conc. hydrochloric acid and 90 ml deionized water).

Stirring is continued for 15 min., pH is adjusted to 2.6 with 32% sodium hydroxide solution and a second $TiO_2$/$Fe_2O_3$/$Al_2O_3$ layer is applied by adding 1 ml/min $TiCl_4$/$FeCl_3$/$AlCl_3$ solution (394 ml of the same composition as first layer). The stirring is continued for another 15 min and then the pigment is filtered off, washed, dried and calcined at 850° C. for 30 min.

The pigment obtained shows a brilliant and intense gold interference color.

Example 5

100 g glass flakes with a maximum diameter of 40 μm (average 22 μm) and an average thickness of 0.5 μm (refractive index 1.5) are suspended in 2 l of deionized water. The suspension is heated to 75° C., adjusted to a pH of 1.8 with dilute hydrochloric acid, first of all coated with $SnO_2$ by adding 3.3 ml/min of $SnCl_4$ solution (from 2.2 g of $SnCl_4$ and 7.5 ml of conc. hydrochloric acid in 100 ml of deionized water). The pH is held constant using 32% sodium hydroxide solution.

Stirring is continued for 15 min and then coating with $TiO_2$ is carried out under the same pH/temperature conditions by adding 1 ml/min $TiCl_4$ solution (15 ml with 400 g $TiCl_4$/l) and keeping the pH constant with 32% sodium chloride solution.

Stirring is continued for 15 min., the pH is adjusted to 2.6 with 32% sodium hydroxide solution and an $Al_2O_3$/$Fe_2O_3$/$TiO_2$ layer is applied by adding 1 ml/min $TiCl_4$/$FeCl_3$/$AlCl_3$ solution 376 ml from 157.5 g 30% TiCl$_4$ solution, 236 g 34% FeCl$_3$ solution, 5.9 g AlCl$_3$×6H$_2$O and 60 ml deionized water).

Stirring is continued for 15 min., the pH is adjusted to 7.5 with 1.3 m/min 32% sodium hydroxide and then stirring is continued for 15 min more. Coating with SiO$_2$ is carried out by adding 2 ml/min sodium silicate solution with 13.5% SiO$_2$ (from 196 g sodium silicate solution with 27% SiO$_2$ and 196 ml deionized water). The pH is held constant using 15% hydrochloric acid.

Stirring is continued for 30 min., the pH is adjusted to 1.8 by adding 1 ml/min of SnCl$_4$ solution (from 3 g of SnCl$_4$, 10 ml of conc. hydrochloric acid and 90 ml deionized water).

Stirring is continued for 15 min and then the second coating with TiO$_2$ is carried out under the same pH/temperature conditions by adding 2 ml/min TiCl$_4$ solution (280 ml with 400 g TiCl$_4$/l) and keeping the pH constant with 32% sodium hydroxide solution.

Stirring is continued for 15 min., pH is adjusted to 2.6 with 32% sodium hydroxide solution and a final TiO$_2$/Fe$_2$O$_3$/Al$_2$O$_3$ layer is applied by adding 0.8 ml/min TiCl$_4$/FeCl$_3$/AlCl$_3$ solution (72 ml of the same composition as the first layer). The stirring is continued for another 15 min. and then the pigment is filtered off, washed, dried and calcined at 850° C. for 30 min.

The pigment obtained shows an even more brilliant and intense gold interference color than the pigment according to example 4.

USE EXAMPLES

Use Example 1

Shimmering Foundation

| Phase A | | |
|---|---|---|
| Extender W | Mica, CI 77891 (Titanium Dioxide) | 9.00% (1) |
| Microna ® Matte Yellow | Mica, CI 77492 (Iron Oxides) | 4.00% (1) |
| Microna ® Matte Red | CI 77491 (Iron Oxides), Mica | 0.40% (1) |
| Microna ® Matte Black | CI 77499 (Iron Oxides), Mica | 0.30% (1) |
| Pigment according to Example 1 | Silica, CI77891 (Titanium dioxide), Mica, Tin oxide | 4.50% (1) |
| Ronasphere ® | Silica | 5.00% (1) |
| Phase B | | |
| Blanose 7 HF | Cellulose Gum | 0.20% (2) |
| Veegum | Magnesium Aluminium Silicate | 1.00% (3) |
| Texapon K 1296 | Sodium Lauryl Sulfate | 0.60% (4) |
| Triethanolamine | Triethanolamine | 0.50% (1) |
| Titriplex III | Disodium EDTA | 0.25% (1) |
| Methyl-4-hydroxybenzoate | Methylparaben | 0.15% (1) |
| 1,2-Propandiol | Propylene Glycol | 10.90% (1) |
| Water | Aqua (Water) | 42.95% |
| Phase C | | |
| Isopropyl myristate | Isopropyl Myristate | 8.00% (4) |
| Paraffin | Paraffinum Liquidum (Mineral Oil) | 3.60% (1) |
| Crodamol SS | Cetyl Esters | 2.60% (5) |
| Monomuls 60-35 C | Hydrogenated Palm Glycerides | 1.70% (4) |
| Stearic acid | Stearic Acid | 1.50% (1) |
| Eusolex ® 6300 | 4-Methylbenzylidene Camphor | 1.30% (1) |
| Eusolex ® 4360 | Benzophenone-3 | 0.50% (1) |
| RonaCare ™ Tocopheryl acetate | Tocopheryl Acetate | 0.10% (1) |
| Magnesium stearate | Magnesium Stearate | 0.10% (1) |
| Propyl-4-hydroxybenzoate | Propylparaben | 0.05% (1) |
| Phase D | | |
| Parfum 200 529 | Parfum | 0.20% (6) |
| Euxyl K 400 | Phenoxyethanol, Methyldibromo-Glutaronitrile | 0.20% (7) |

Procedure:

Heat all ingredients of phase C to 75° C. while stirring until everything is melted. Add Blanose and Veegum separately to cold water of phase B under high agitation (Turrax). Heat to 75° C. and add the remaining ingredients of phase B and mix until the mixture is smooth and uniform. Add ingredients of phase A. At 75° C. incorporate phase C into phase A/B and homogenize for 2 min. Add phase D at 40° C. Cool down to room temperature while stirring and adjust pH to 6.0-6.5 einstellen (e.g. citric acid solution).

Supplier:

(1) Merck KGaA/Rona®

(2) Aqualon GmbH (3) Vanderbilt (4) Cognis GmbH (5) Croda GmbH (6) Fragrance Resources (7) Schülke & Mayr GmbH

Use Example 2

Shower Gel

| Phase A | | |
|---|---|---|
| Pigment according to Example 1 | | 0.10% (1) |
| Keltrol T | Xanthan Gum | 0.75% (2) |
| Water | Aqua (Water) | 64.95% |
| Phase B | | |
| Plantacare 2000 UP | Decyt Glucoside | 20.00% (3) |
| Texapon ASV 50 | Sodium Laureth Sulfate, Sodium Laureth-8 Sulfate, Magnesium Laureth Sulfate, Magnesium Laureth-8 Sulfate, Sodium Oleth Sulfate, Magnesium Oleth Sulfate | 3.60% (3) |
| Bronidox L | Propylene Glycol, 5-Bromo-5-Nitro-1,3-Dioxane | 0.20% (3) |
| Parfum Everest 79658 SB | Parfum | 0.05% (4) |
| 1% FD&C Blue No. 1 in water | Aqua (Water), CI 42090 (FD&C Blue No. 1) | 0.20% (5) |

-continued

| | | |
|---|---|---|
| Phase C | | |
| Citric acid monohydrate | Citric Acid | 0.15% (1) |
| Water | Aqua (Water) | 10.00% |

Procedure:

Disperse the pigment in the water of phase A. Incorporate Keltrol T while stirring and mix until thoroughly dispersed. Add phase B and phase C successively to phase A while stirring and stir slowly until the gel is homogeneous.

Supplier:

(1) Merck KGaA/Rona®

(2) Kelco (3) Cognis GmbH (4) Haarmann & Reimer GmbH (5) BASF AG

Use Example 3

Intaglio Printing Ink

Intaglio printing ink consisting of

| | |
|---|---|
| 70 g | Nitrocellulose-based binder from Gebrüder Schmidt 95 MB 011 with a solid content of 20% |
| 15 g | Minatec ® 31 CM (conductive pigment from Merck KGaA, Darmstadt, Germany |
| 15 g | Coated glass flakes according to Example 1 |

Use Example 4

Plastic 1 kg of polyethylene (PE-HD) granules are uniformly wetted in a tumble mixer with 2 g of adhesion agent. Then 10 g coated glass flakes according to Example 4 and 2 g of Iriodin LS 825 (conductive pigment from Merck KGaA, Darmstadt, Germany with a particle size <15 μm are added and the components are mixed for 2 minutes.

These granules are processed under conventional conditions on an injection moulding machine to give small stepped plates measuring 4×3×0.5 cm. The small stepped plates are notable for their lustre and their laser markability.

Use Example 5

Coating

| | |
|---|---|
| 30 g | Coated glass flakes according to Example 5 |
| 10 g | Minatec ® 40 CM (conductive pigment from Merck KGaA, Darmstadt, Germany |
| 42 g | Paint base (AU-MF system, solids = 19%) |
| 18 g | Diluent mixture |

The invention claimed is:

1. Multilayer pigments based on glass flakes comprising glass flakes having a thickness of less than 1 μm which are coated with at least one sequence of layers
   (A) a coating having a refractive index n>1.8
   (B) a coating having a refractive index n<1.8 and
   (C) a coating having a refractive index n>1.8, and optionally,
   (D) an outer protective layer
   with the proviso that the layer packet (A)+(B) may be present in the layer sequence (A)+(B)+(C) up to four times,
   wherein the layers comprise a metal oxide, metal suboxide, metal fluoride, metal oxyhalide, metal chalcogenide, metal sulfide, metal nitride, metal oxynitride, or a metal carbide, or a mixture thereof.

2. Multilayer pigments according to claim 1, wherein the glass flakes have a thickness of less than 0.8 μm.

3. Multilayer pigments according to claim 1, wherein layers with a refractive index n>1.8 comprise $TiO_2$, $Fe_2O_3TiFe_2O_5$, $Fe_3O_4$, $BiOCl$, $Cr_2O_3$, $ZrO_2$, $ZnO$, $SnO_2$, $CoO$, $Co_3O_4$, $VO_2$, $V_2O_3$, an iron titanate, iron oxide hydrate, titanium suboxide, bismuth vanadate, cobalt aluminate, metal sulfide, metal chalogenide, metal nitride, metal oxynitride, metal carbide, or a mixture thereof.

4. Multilayer pigments according to claim 1, wherein layers with a refractive index n<1.8 comprise $SiO_2$, $Al_2O_3$, $AlO(OH)$, $B_2O_3$, $MgF_2$ or a mixture thereof.

5. Multilayer pigments according to claim 1 wherein the glass flakes are coated with only three layers.

6. Multilayer pigments according to claim 1, wherein the glass flakes have a thickness of less than 0.5 μm.

7. Multilayer pigments according to claim 1, wherein the glass flakes have a thickness of 0.2-0.5 μm.

8. Multilayer pigments according to claim 1, wherein the glass flakes have a thickness of 0.1-0.8 μm.

9. Multilayer pigments according to claim 1, wherein the glass flakes are of quartz glass.

10. Multilayer pigments according to claim 1, wherein the glass flakes are of A glass.

11. Multilayer pigments according to claim 1, wherein the glass flakes are of B glass.

12. Multilayer pigments according to claim 1, wherein the glass flakes are of C glass.

13. Multilayer pigments according to claim 1, wherein the glass flakes are of ECR glass.

14. Multilayer pigments according to claim 1, wherein the glass flakes have an aspect ratio of 10-300.

15. Multilayer pigments according to claim 1, wherein the glass flakes have a thickness of about 0.85 μm.

16. A method of preparing a multilayer pigment according to claim 1 which comprises coating of the glass flakes by wet chemical coating, or by chemical or physical vapor deposition and calcining the coated glass flakes.

17. A plastic article or composition, coating, powder coating, paint, ink, printing ink, glass article or composition, ceramic product, agriculture foil, cosmetic formulation, laser-marking on paper or plastic comprising a multilayer pigment according to claim 1.

18. A composition containing the multilayer pigments according to claim 1.

19. Non-dusting powder, paste or granule containing multilayer pigments according to claim 1.

20. Multilayer pigments based on glass flakes comprising glass flakes having a thickness of less than 1 μm which are coated to have one of the following layer structures:

| | | | |
|---|---|---|---|
| glass flakes | + TiO$_2$ | + SiO$_2$ | + TiO$_2$ |
| glass flakes | + TiO$_2$ | + SiO$_2$ | + Fe$_2$O$_3$ |
| glass flakes | + TiO$_2$ | + SiO$_2$ | + TiO$_2$/Fe$_2$O$_3$ |
| glass flakes | + TiO$_2$ | + SiO$_2$ | + (Sn,Sb)O$_2$ |
| glass flakes | + (Sn,Sb)O$_2$ | + SiO$_2$ | + TiO$_2$ |
| glass flakes | + Fe$_2$O$_3$ | + SiO$_2$ | + (Sn,Sb)O$_2$ |
| glass flakes | + TiO$_2$/Fe$_2$O$_3$ | + SiO$_2$ | + TiO$_2$/Fe$_2$O$_3$ |
| glass flakes | + TiO$_2$ | + SiO$_2$ | + MoS$_2$ |
| glass flakes | + TIO$_2$ | + SiO$_2$ | + Cr$_2$O$_3$ |
| glass flakes | + Cr$_2$O3 | + SiO$_2$ | + TiO$_2$ |
| glass flakes | + Fe$_2$O$_3$ | + SiO$_2$ | + TiO$_2$ |
| glass flakes | + TiO$_2$ | + Al$_2$O$_3$ | + TiO$_2$ |
| glass flakes | + Fe$_2$TiO$_5$ | + SiO$_2$ | + TiO$_2$ |
| glass flakes | + TiO$_2$ | + SiO$_2$ | + Fe$_2$TiO$_5$/TiO$_2$ |
| glass flakes | + TiO suboxides | + SiO$_2$ | + TiO$_2$ suboxides |
| glass flakes | + TiO$_2$ | + SiO$_2$ | + TiO$_2$ + SiO$_2$ + TiO$_2$+ Prussian Blu |
| glass flakes | + TiO$_2$ | + SiO$_2$ | + TiO$_2$ + SiO$_2$ + TiO$_2$ |
| glass flakes | + TiO$_2$ + SiO$_2$ + T$_2$ | + SiO$_2$ | + TiO$_2$ + SiO$_2$ + TiO$_2$ | and optionally, (D) an outer protective layer.

21. Multilayer pigments according to claim 20, wherein the glass flakes have a thickness of 0.1-0.8 μm.

22. Multilayer pigments according to claim 20, wherein the glass flakes have a thickness of about 0.85 μm.

* * * * *